United States Patent [19]

Blanco et al.

[11] 3,956,558

[45] May 11, 1976

[54] CERAMIC DECALCOMANIA AND METHOD

[75] Inventors: Louis A. Blanco, Tuckahoe, N.Y.; William F. Wenning, Beaver Falls, Pa.

[73] Assignee: Commercial Decal, Inc., Mount Vernon, N.Y.

[22] Filed: Jan. 24, 1975

[21] Appl. No.: 543,733

Related U.S. Application Data

[63] Continuation-in-part of Ser. No. 303,619, Nov. 3, 1972, abandoned.

[52] U.S. Cl. .................. 428/204; 106/49; 106/53; 106/54; 427/190; 427/193; 427/199; 427/203; 427/204; 427/205; 428/207; 428/208; 428/428; 428/432
[51] Int. Cl.² .................. C03C 1/00; C03C 3/00; C03C 3/10; C03C 3/12
[58] Field of Search ... 117/3.1–3.2, 13, 45, 62, 70 A, 117/125; 106/49, 53, 54; 427/197, 199, 203, 427/204, 205, 376, 190, 193

[56] References Cited
UNITED STATES PATENTS

| | | | |
|---|---|---|---|
| 3,418,156 | 12/1968 | Medert | 117/3.1 |
| 3,656,984 | 4/1972 | Hoffman | 106/49 |
| 3,769,055 | 10/1973 | Blanco | 117/3.1 |
| 3,857,746 | 12/1974 | Blanco et al. | 117/3.1 |
| 3,862,844 | 1/1975 | Wenning et al. | 106/49 |

*Primary Examiner*—J. C. Cannon
*Attorney, Agent, or Firm*—Lerner, David, Littenberg & Samuel

[57] ABSTRACT

An overglaze decalcomania is provided which includes a prefused low melting point glass flux or frit as a protective layer and is substantially resistant to both acid and alkali attack, to mechanical abrasion, and inhibits release of lead, cadmium and other toxic substances normally found in decalcomanias. The frit is comprised of increments of lead oxide, silicon dioxide, cadmium oxide and tin oxide, and optionally titanium dioxide. It can include substituents of conventional frits as well. There is also provided a method for preparing such an overglaze decalcomania.

8 Claims, No Drawings ic appearance and chemical make-up of the decorative decal. Although these changes may detract from the aesthetic apparance of the ware, this drawback is only a minor consideration as compared to the serious consequences which are possible as a direct result of such changes in the decal as will hereinafter be explained.

CERAMIC DECALCOMANIA AND METHOD

CROSS REFERENCES TO RELATED APPLICATIONS

This application is a Continuation-In-Part of application Ser. No. 303,619, filed on Nov. 3, 1972, now abandoned.

BRIEF SUMMARY OF THE INVENTION

The present invention relates to an overglaze decalcomania which includes a protective layer of a low melting point frit which contains tin oxide, and a method of preparing such overglaze decalcomania employing dry or wet printing techniques.

BACKGROUND OF THE INVENTION

A decalcomania (decal) usually is comprised of a multi-layer structure including a backing, a design or pigment layer, and a protective layer applied over the design layer. The colors in the design layer are formed from inorganic pigments or oxides. A layer facilitating release of the backing from the design may be interposed between the backing layer and the design layer. The protective layer applied over the design layer can comprise a low melting point glass which acts as a protective barrier over the surface of the design layer, which protective barrier, being glass, is resistant to both alkalis and acids, as well as to mechanical abrasion. Moreover, since this layer is transparent, the design and colors of the finished decal will appear as clearly as if no glass barrier were present.

A number of different types of decals are used at present in the pottery industry to apply patterns to ceramic ware. One of these is the so-called "underglaze" decal. This type of decal is applied to the ware after the ware has been formed but before it is glazed. Thereafter, a glaze is applied over the ware and decal. This glaze consists of a vitreous coating. The coating is formed directly from raw materials so that a very high temperature must be used in firing the ware to form the glass. The result of this process is a protective coating over the pigment such that the pigment will not be subject to chemical and mechanical attack such as produced by modern chemical detergents and mechanical washing devices. However, the use of such a high temperature as is necessary to form the glaze destroys the color value of many of the pigments that would be preferred to produce the desired colors. In addition, the glaze may be somewhat opaque so that the designs of the decal are obscured. It will be appreciated from the foregoing that this underglaze ceramic decal is limited in application.

As a result of these limitations, the so-called "overglaze" decals were developed. That is, decals which are applied to the ware after the high temperature glaze has been put on. These overglaze decals can generally be divided into two classes — silk screen decals and lithographic decals.

In the silk screen process, a silk screen template or stencil is placed over the surface on which pigment is to be deposited and the pigment is applied through the screen. If the decal were of the "water mount" or "slide off" type, the surface on which the pigment is applied would be the layer of water soluble gum which has been placed over a paper backing. In this process, a relatively thick layer of pigment is deposited over the entire surface covered by the stencil. In order to increase the permanence of the design in the silk screen decal, a quantity of powdered low melting point glass may be mixed with the pigment so that, when the pattern is set by the application of heat, this powdered glass will fuse and become a part of the pattern itself. The silk screen decals, however, like the underglaze decals, are subject to a number of limitations. For example, the fine and clear cut designs and tonal variations available in the lithographic process cannot be obtained by the silk screen process. Also, the thicker pattern which results from this process is not always desirable. Because of these limitations lithographic decals are widely used in the industry.

Lithographic decals are formed by printing the desired pattern on the decal by a lithographic process. In the case of the water-mount decals, the pattern is printed on the top of the water soluble gum layer. As is the case with other types of decals it is essential that the pigment of lithographic decals be protected from the chemical and mechanical attack previously referred to. If it is not, the design will lose its lustre and brightness and the pigment may even rub off entirely with handling. The obvious solution to this problem would seem to be a mixture of powdered low melting glass with the pigments as in the silk screen process. There are a number of reasons why this is not normally done. As stated previously, in the case of the mixture, the number of pigments which could be used is limited since some are attacked by molten glass. In the lithographic process the thickness of the layer, and therefore the amount of pigment which can be applied is limited by the nature of the process itself. In addition, only about half the surface area of the decal surface is covered by the pigment dots in this process and so a higher concentration of pigment must be used. Therefore, if sufficient powdered glass to protect the design were mixed with the pigment in this process, the pigment would be so diluted that the color value would be seriously impaired or completely destroyed.

With the advent of modern chemical detergents and mechanical washing devices it is essential that the pigments of ceramic decals be protected from chemical and mechanical attack. That is, if the pigment were not protected it would fade, be abraded, and in many cases rub off. Thus, where possible, the use of a protective layer of glass is highly desirable and has been employed for the above purposes for years. Unfortunately, however, even the use of a protective barrier of glass has not been entirely satisfactory and, in fact, has significant drawbacks in certain applications. One of the primary applications of ceramic ware containing decorative decals resides in their use as household utensils such as in oven ware, casserole pans or dishes, plates, salad bowls, cups, mugs, other dishes and the like. During such use, the ware is subjected to extreme conditions such as widely varying temperatures, highly acidic or basic substances as well as even corrosive substances. After determinate periods of use under such conditions, subtle and in many instances even substantial changes can be observed in both the physical appearance and chemical make-up of the decorative decal. Although these changes may detract from the aesthetic apparance of the ware, this drawback is only a minor consideration as compared to the serious consequences which are possible as a direct result of such changes in the decal as will hereinafter be explained.

As indicated above, the colors in the design layer are formed from inorganic pigments including metallic oxides or sulfides. Colors obtainable from such pigments include yellow where lead oxide, lead chromate, cadmium oxide and/or cadmium sulfide are employed alone or in conjunction (e.g. as complexes) with other pigments; red where cadmium sulfoselenide and/or lead chromate are employed alone or in conjunction with (e.g. as complexes) other pigments, and white where lead molybdate is employed. Such lead and/or cadmium based pigments are toxic and thus human intake must be avoided.

The incidence of poisoning from intake if toxic metallic substances, such as lead found in lead-based paints, has been increasing in recent years at an alarming rate causing great concern especially among public officials and health authorities of large urban ceters where large pockets of sub-standard housing exist and lead-based paints have been employed. The result is that all articles and materials containing toxic metallic substances have become suspect, and especially those which come in contact with food and drink. Ceramic wares containing decorative decalcomanias of course fall into the latter category.

The use of protective barriers of glass over the design layer of decalcomanias has achieved some success in inhibiting release of toxic substances present in the design layer. However, it has been found that after repeated washings of ceramic ware, even containing such a protective barrier, at high temperatures employing caustic detergents or subjecting such ware to highly acidic and/or alkaline substances (such as polishes or even foods over long periods of time), some lead and possibly cadmium release through the protective glass barrier has been observed.

Kane, U.S. Pat. No. 2,734,840, discloses a lithographic overglaze decal which is strongly resistant to chemical and mechanical attack and which is made by dusting a mixture of powdered glass and solid pigment powder or solid pigment globules on a backing sheet containing an adhesive such as a gum or varnish to form a design layer thereon and thereafter covering the pigment-glass design layer with a layer of powdered low melting point glass. The decalcomania disclosed and claimed in the Kane patent has achieved wide acceptance and approval and, in fact, is the standard in the industry. The layer of powdered low melting point glass has been found to be somewhat successful in inhibiting lead and/or cadmium release from the design layer.

It has been found that the shortcomings of conventional protective barriers of glass, employed in decalcomanias, in inhibiting release of toxic materials from the design layer of the decalcomania are attributed primarily to the chemical make-up of the glass itself. Most glasses used as a protective barrier are lead boro-silicate glass containing various additives to build-in various desirable properties in the glass. For example, such glass may include zirconium dioxide ($ZrO_2$) in amounts as high as up to 15% by weight or more to impart resistance to alkali attack, and titanium dioxide in amounts up to 15% or more to impart resistance to acid attack. It is theorized that zirconium and/or titanium can be employed in such large quantities because they are basically compatible with the other glass-forming constituents and fit nicely into the lattice or matrix structure of the glass. However, these metallic oxides are not entirely satisfactory because they tend to adversely affect the colors of the design layer. Attempts have been made to incorporate other materials into the glass matrix to overcome the shortcomings of the zirconium and titanium additives, without must success.

The applicants have invented a decalcomania including a protective barrier of a low melting point glass or frit and a method therefor, which overcomes the disadvantages attendant with prior art frits and decalcomania containing the same.

OBJECTS

It is accordingly an object of the invention to provide an improved overglaze decalcomania for ceramic ware including a protective layer of a low melting point frit which is resistant to chemical and mechanical attack when the ware is immersed in detergent solutions, or exposed to extremes of high temperature waters and mechanical agitation and abrasion, and is resistant to lead and/or cadmium release from the design layer.

A further object of the invention is to provide a method for preparing such improved decalcomania.

DETAILED DESCRIPTION OF THE INVENTION

In accordance with the present invention, there is provided an overglaze decalcomania, preferably for ceramic ware, comprising a backing sheet, a design layer disposed on said backing sheet and a protective layer of a low melting point glass comprising increments of lead oxide, silicon dioxide, cadmium oxide and tin oxide, so that after the decalcomania is applied to a vitreous surface (ceramic ware) and the assemblage fired, the protective layer of tin oxide-containing low melting point glass fuses and tightly binds the design layer to the ware and forms a contiguous, durable protective coating on the surface of the ware which is impervious to acid attack and inhibits release of lead and/or cadmium or other toxic materials present in the design layer.

In addition, in accordance with the present invention, there is provided a method for preparing the above-described overglaze decalcomania wherein a design layer is applied to a backing sheet and a protective coating in the form of the tin oxide-containing low melting glass is deposited on the design layer. If desired, the low melting glass layer can be initially deposited on the backing sheet and the design layer applied to the glass layer.

The tin oxide present in the low melting glass or frit of the invention has the formula $SnO_2$ and may be present in amounts ranging from about 1 to about 15% by weight, preferably from about 2 to 15% by weight, more preferably from about 6 to 15% by weight, and most preferably from about 6 to about 8% by weight, depending upon the other components present and the properties desired. Amounts greater than 15% $SnO_2$ would cause the frit to be too high melting. It is preferred that the tin oxide be employed in conjunction with from 0.5 to 1 to about 10% by weight, preferably from about 1 to about 8% by weight, more preferably from about 1 to about 6% by weight and most preferably from about 1 to about 3% by weight titanium dioxide ($TiO_2$). However, where amounts of from about 10 to about 15% by weight tin oxide are employed, if desired, very limited amounts of titanium dioxide need be present, i.e., more than zero, but less than about 2% by weight, however, where no titanium dioxide is used, the base glass frit could be too high melting and thus must be reformulated so as to increase the amount of alkali oxides in the frit and thereby lower the melting point of the frit.

The tin oxide by itself imparts to the low melting point glass or frit excellent resistance to both acid and alkali attack, inhibits lead and/or cadmium release from the design layer and allows for expansion of the frit upon firing. Thus, a protective layer of the low melting glass or frit acts as a shield to seal the decal from external attack and to seal in all toxic substances present in the design layer and thereby prevent contact of these toxic substances with food or drink.

The titanium dioxide by itself imparts to the low melting point glass or frit good resistance to acids. However, it is also deleterious to color stability of the design layer in that it promotes color changes therein. For example, the use of titanium dioxide alone tends to cause blues in the design layer to turn green and greens (e.g. chromium titanate) to turn yellow or gold.

Surprisingly and unexpectedly, it has been found that when tin oxide is employed in combination with and in conjunction with titanium dioxide, the combination imparts to the glass or frit increased resistance to acid attack and lead and/or cadmium release from the design layer, such resistance being substantially greater than that imparted by tin oxide alone or titanium dioxide alone. Furthermore, it has been found that the combination does not adversely affect color stability of the design layer or resistance to alkali attack or expansion qualities of the glass or frit. Accordingly, it can be concluded that with respect to its propensity to impart to the frit resistance to acid attack and inhibit lead and/or cadmium release from the design layer, the combination of tin oxide and titanium dioxide, when employed in a low melting point frit, is indeed a synergistic combination, and surprisingly so. This synergistic combination includes tin oxide and titanium dioxide in a weight ratio to each other ($SnO_2:TiO_2$) within the range of from about 8:1 to about 1:5 and preferably from about 8:1 to about 3:1.

Depending upon the properties desired, the low melting point frit will include from about 15 to about 65% and preferably from about 30 to about 40% by weight silicon dioxide ($SiO_2$) and from about 10 to about 50% and preferably from about 25 to about 35% by weight lead oxide (PbO) as the major glass-forming substituents.

The frit will also include from about 1 to about 10% and preferably from about 3 to about 9% by weight cadmium oxide (CdO) to impart color stability to the design layer of the decalcomania. The cadmium oxide inhibits the reds and yellows in the design layer from forming lead sulfide and thereby turning black.

The low melting frit may also include a wide variety of alkali oxides to impart desired properties thereto as will be seen hereinafter. For example, the frit may contain from 0 to about 20% and preferably from 3 to about 11% by weight sodium oxide and/or potassium oxide and from 0 to about 4% and preferably from about 0.5 to about 1.5% by weight lithium oxide to impart increased solubility to the frit and thereby make it lower melting.

Furthermore, the frit may include alkaline earth metal oxides such as oxides of calcium, magnesium and/or strontium in lieu of a portion of the alkali metal oxides mentioned above to adjust expansion characteristics of the frit. The alkaline earth metal oxides may be employed in amounts of up to about 5% and preferably from about 3 to about 5% by weight of the frit.

The frit may also include from 0 to about 20% and preferably from about 8 to about 16% by weight boric oxide ($B_2O_3$) as a so-called "coordination source of oxygen."

In addition, the frit may include from 0 to about 6% by weight alumina ($Al_2O_3$) to impart the desired viscosity characteristics to the frit.

Prior art low melting frits contain up to 15% by weight zirconium dioxide to impart resistance to alkali attack, for example by detergents, to the decalcomania. In the present invention, the use of zirconium dioxide is purely optional in that adequate alkali or detergent resistance is imparted to the frit by the tin oxide. However, zirconium dioxide may be employed in the frit in amounts within the range of from about 1 to about 4% by weight to enhance the already present resistance to alkali attack.

The low melting point frit can have a melting point within the range of from about 980° F. to about 1250°F., depending upon its chemical composition, and therefore is useful in a wide variety of decalcomania applications. Thus, for example, where a low melting (e.g. melts at less than 1000°F.) viscous, almost fluid-like frit or protective glass layer is desired, such as for use in low melting point wares (for example, aluminum enamel) reduced content of tin oxide and titanium dioxide is required (e.g. 6–7% tin oxide and 0–1% titanium dioxide) and alkali oxides (such as sodium oxide and/or potassium oxide) can be added, for example in amounts up to 20% by weight and preferably in amounts from 7 to 11% by weight. In addition, the content of zirconium oxide may be increased to impart desired resistance to alkali attack thereto. Inasmuch as frits with lower melting points are rather soft and have less resistance to chemical (especially acid) attack than higher melting frits, the quantities of tin oxide and titanium dioxide may be somewhat increased with concomitant increase in alkali oxides to impart the desired degree of chemical resistance while retaining the desired degree of fluidity in the frit.

Conversely, higher melting point frits which are more viscous, less fluid, harder and more resistant to chemical attack can be obtained by reducing the alkali oxide content thereof and increasing the tin oxide and titanium dioxide content thereof, for example by employing from 3 to 7% alkali oxides and from 7 to 8% tin oxide and 1 to 2% titanium dioxide. In such case, zirconium dioxide need not be employed, or if desired, employed in amounts of 1% or less.

Viscosity of the frit may also be somewhat influenced by the presence of alumina. Thus, where higher viscosity frits are desired, concentrations of alumina can be increased.

It will be appreciated by one skilled in the art that by so varying the amounts of alkali oxides and tin oxide and titanium dioxide employed in the frit, a frit of any desired melting point and fluidity can be obtained, for use with any desired ware, in accordance with the invention. The versatility of the low melting point frit is a primary advantage thereof.

A preferred frit formulation in accordance with the present invention is as follows:

| COMPONENT | % BY WEIGHT |
|---|---|
| $SnO_2$ | 7 |
| $TiO_2$ | 2 |
| $SiO_2$ | 35 |
| PbO | 29 |

| COMPONENT | % BY WEIGHT |
| --- | --- |
| $B_2O_3$ | 11 |
| CdO | 5 |
| $Li_2O$ | 1 |
| $Na_2O$ }  $K_2O$ | 7 |
| $Al_2O_3$ | 3 |
|  | 100% |

The low melting glass or frit is prefused prior to application as a protective coating over the design layer. Thus, the various oxide components mentioned hereinbefore may be fused to form a glass in accordance with conventional techniques. Thereafter, the prefused glass is powdered so that it will have an average particle size within the range of from about 4 to about 12 microns prior to use.

It is essential that the frit so formed be fully matured (fluid) at the firing temperature so that it will fuse to the design layer to form a protective layer thereon and bond the design layer to the ware.

The glass or frit protective layer is colorless so that it does not interfere with or mask the colors of the design layer. However, the glass layer may include a metallic oxide in an amount within the range of from about 1 to about 8% by weight.

An amount of the low melting glass or frit should be deposited on the design layer so that the protective glass coating thereafter formed will have a thickness within the range of from about 6 to about 28 microns and preferably from about 9 to about 20 microns. Thus, the ratio of thickness of the glass protective coating to the design layer may be within the range of from about 1:1 to about 3-1/2:1 and preferably from about 2:1 to about 2-1/2:1.

The decal of the present invention may be provided with any suitable backing, such as a dry strippable backing or a solvent mount, or the decal may be a water mount slide-off decal. The backing may be of paper or other suitable material such as, for example, plastic or fabric.

The design layer may be applied to the backing as one or more layers of an ink comprising an oxide colorant and a printing medium or vehicle with or without a glass flux or binder. The ink should contain from about 30 to about 60% by weight and preferably from about 35 to about 70% or more by weight oxide colorant. The printing medium or vehicle may be formed, for example, from one or more of such materials as drying oils, varnishes, or resins. Some examples of suitable resins are alkyds, phenolics, urea-formaldehydes, melamine-formaldehydes, polyesters, melamine alkyds, vinyls, and arcylics. Various additives may be incorporated into the vehicles, for example, dryers, promotors, and/or accelerators.

The coloring agents of the design layer comprise ceramic pigments, having an average particle size within the range of from about 0.5 to about 2 microns which are incorporated into the binder or vehicle. Preferably, the pigments are metallic oxides of fine particle size, such as of an average particle size of less than about 1 micron. The pigments which may be used and the manner of their use are known to those skilled in the art. The oxides of the following elements are mentioned merely by way of example of some suitable ceramic pigments and the colors obtainable therefrom:

| Oxide of | Color |
| --- | --- |
| Fe, Cr, Zn | Brown |
| Co, Al | Blue |
| Cr | Green |
| Pb, Sb, Cd | Yellow |
| Cd, Se, S | Red |

As known to those skilled in the art, the composition of the vehicle or binder of the design layer is varied depending upon the oxide or oxides used as coloring agent and whether or not glass is present in the design layer. While the ink formulation must be varied depending upon the oxides employed, as is known to those skilled in the art, some typical ink formulations wherein the parts are expressed as parts by weight are as follows:

| INGREDIENT: | 1. | 2. | 3. |
| --- | --- | --- | --- |
| Gel No. 100 (linseed-alkyd resin varnish gelled by aluminum octoate, supplied by Zobel Co.) | 10 | 12 | 15 |
| Linseed No. 4 (linseed oil of 62.1 stokes viscosity) | 10 | — | — |
| Linseed No. 1 (linseed oil of 14.4 stokes viscosity) | 15 | — | — |
| Lead Drier | 2 | 4 | 4 |
| Manganese Drier | 2 | 4 | 4 |
| Oxide (pigment) | 60 | 120 | 120 |
| Aroplaz 2506 (alkyd resin supplied by Archer-Daniels) | — | 30 | 25 |
| Aroplaz 1274 (alkyd resin supplied By Archer-Daniels) | — | 30 | 25 |
| Puffo No. 2 (thixotropic control agent supplied by Mooney | — | 3 | 3 |
| Petroleum Jelly | — | — | 5 |

The design layer may include a limited quantity of powdered glass therein to act as a bonding agent. Other bonding agents may be employed in conjunction with the design forming components as will be apparent to one skilled in the art.

The design layer of one embodiment of the decalcomania of the invention can be formed by mixing particles of the aforedescribed tin oxide containing frit with each of the ceramic colors or pigments to be employed, prior to laydown of the colors to form the design layer. The frit will be mixed with each of the colors, for example, by blending, in an amount to provide a weight ratio of color frit within the range of from about 1:4 to about 4:1 and preferably, from about 1:2 to about 2:1. The frit and color may be sintered together for added stability. The frit and color particles to be mixed will have an average particle size ranging from 0.5 to 2 microns.

Where the frit particles are initially mixed with the pigment particles in forming the design layer, application of a further protective layer or barrier over the design layer is optional, although preferred. In such case, the protective layer or barrier may be of the same composition as the tin oxide frit mixed with the pigment particles or may include any conventional frit formulation.

It will be also understood that where the tin oxide containing frit described above is employed as a protective layer or barrier, frit particles of other conventional frit formulations may be mixed with pigment particles in forming the design layer. The design layer of the decalcomania of the invention is formed by conventional dry printing or wet printing techniques.

Where wet printing is employed, the decal including the design layer and protective layer are formed as follows: A wet ink formulation preferably free of glass and comprising an oxide coloring agent and a liquid printing medium or vehicle such as a drying oil, varnish or resin is wet printed on a decalcomania backing sheet such as by screen printing or offset lithography to form a wet design layer thereon. Thereafter a protective coating in the form of a prefused glass frit or flux is separately deposited on the wet design layer. If desired, the prefused glass flux layer may be initially deposited on the backing sheet and the wet design layer wet printing on the glass layer. When the backing sheet containing the wet design layer and protective coating is positioned on a glazed piece of ware and fired, the protective coating or prefused glass flux fuses and tightly binds the design layer to the ware. The frit may be applied over the design by various methods, such as, silk screening, offset printing, or by printing a clear film over the design and then dusting a prefused frit over the film. If desired, the dusting operation may be eliminated by incorporating the frit into a film such as a printing varnish, oil or resin.

A full disclosure of this wet printing technique is set out in U.S. Application Ser. No. 193,153, filed Oct. 27, 1971 by Blanco, now U.S. Pat. No. 3,769,055, issued on Oct. 30, 1973.

Conventional dry printing techniques which may be employed to form the design layer include screening, offset lithography, and the like.

With respect to the dry printing technique, the layer of powdered low melting point glass may be applied, for example, to a dry pigment or design layer by either of the methods hereinafter described. By one method, a layer of varnish may be applied by a lithographic process to the areas it is desired to protect and the powdered glass then dusted on. This procedure could be repeated until a layer of desired thickness has been built up.

Another method which may be used is to suspend the powdered glass in one of the various commonly known screening media. The contents of this paste may vary between 60 to 80 percent by weight of powdered glass and 40 to 20 percent by weight of the liquid vehicle. This paste may then be applied over the desired area by means of a silk or metal screening fabric acting as a stencil. By this method the area of application is easily controlled.

Once the decal is complete, it is transferred to the article of pottery in the usual manner. That is, the decal is placed on the ware in the wet condition and the paper removed by sliding it from under the decal. The article is then fired at a relatively low temperature and the powdered glass fused so as to form an integral part of the plate and provide a glass layer which protects the pigment from chemical or mechanical action. A relatively low temperature can be used where the layer of glass powder is made up of prefused glass which will melt at much lower temperature than is required to fuse the raw materials from which the glaze on the ceramic ware itself is formed. The usual firing temperature required for this operation is between 1000°F. and 1500°F. It should be particularly noted at this point that this low temperature unlike the high temperatures used in applying the glaze to the entire plate, does not operate to destroy or impair the color values of the pigments used. In this decal as in all overglaze decals the glaze is applied before the decal is transferred to the plate, and thus the decal is not subject to high temperatures. But in this case to protect the decal and provide a permanent design a low melting point glass is used over the pigments. The pigment is protected in much the same manner as the underglazed decals and yet the color values are not impaired by the application of very high temperatures such as are required in applying glaze. Pigments of the type which are affected by contact with molten glass are affected in this case at the surface only and not sufficiently to impair color value of decal.

A final supporting and protecting layer may be disposed over the entire decal. This layer may be varnish, lacquer, or some similar substance. This layer serves to protect the decal sheet during storage and shipment and is volatized when heat is applied to the decal. It also aids during transfer of water mount decals in that it protects the powdered glass layer from water.

The decalcomanias of the invention may be employed as decorations for ceramic ware, glassware, pottery, aluminum enamel, or any other ware which melts at 1500°F. or below.

It will be appreciated that the present description has been by way of example only and is not intended as a limitation to the scope of the invention.

What is claimed is:

1. An overglaze decalcomania comprising a backing sheet, a design layer disposed on the backing sheet and a protective layer of low melting point tin oxide-containing glass comprising from about 10 to about 50% by weight lead oxide, from about 15 to about 65% by weight silicon dioxide, from about 1 to about 10% by weight cadmium oxide, from about 1 to about 15% by weight tin oxide, and from about 0.5 to about 10% by weight titanium dioxide, so that after the decalcomania is applied to a vitreous surface and the assemblage fired, the protective layer of low melting point glass fuses and tightly binds the design layer to the vitreous surface, forms a protective coating on the vitreous surface which is resistant to acid attack and inhibits lead and/or cadmium release from the design layer and does not mask the color of the design layer.

2. An overglaze decalcomania in accordance with claim 1 comprising from about 1 to about 8% by weight titanium dioxide.

3. An overglaze decalcomania in accordance with claim 1 comprising from about 1 to about 6% by weight titanium dioxide.

4. An overglaze decalcomania in accordance with claim 1 wherein the protective layer comprises, in addition, from about 1 to about 4% by weight zirconium dioxide.

5. An overglaze decalcomania in accordance with claim 1 wherein the protective layer includes, in addition, up to about 20% by weight boric oxide.

6. An overglaze decalcomania in accordance with claim 1 wherein the design layer is formed from mixtures of frit particles and pigment particles.

7. An overglaze decalcomania in accordance with claim 1 comprising from about 6 to 15% by weight tin oxide.

8. A method for preparing an overglaze decalcomania which comprises applying a design layer to a backing sheet, and applying a protective coating of low melting glass over the design layer, said glass comprising from about 10 to about 50% by weight lead oxide, from about 15 to about 65% by weight silicon dioxide, from about 1 to about 10% by weight cadmium oxide, from about 1 to about 15% by weight tin oxide and from about 0.5 to about 10% by weight titanium dioxide firing the assemblage to fuse the protective coating and form a layer which does not mask the color of the design layer.

* * * * *